Oct. 20, 1959 H. C. HUNT ET AL 2,909,307
APPARATUS FOR TRIMMING, TURNING AND
PRESSING COLLARS AND THE LIKE
Filed April 29, 1957 7 Sheets-Sheet 1

INVENTOR.
HARRY C. HUNT
SAMUEL R. FRANKEL
BY Lee Edelson
ATTORNEY

United States Patent Office 2,909,307
Patented Oct. 20, 1959

2,909,307

APPARATUS FOR TRIMMING, TURNING AND PRESSING COLLARS AND THE LIKE

Harry C. Hunt, Reading, and Samuel R. Frankel, Shillington, Pa., assignors to American Safety Table Company, Inc., Reading, Pa., a corporation of Pennsylvania Application April 29, 1957, Serial No. 655,903

23 Claims. (Cl. 223—2)

This invention relates generally to apparatus for manufacturing portions of articles of wearing apparel and particularly to apparatus operable for trimming excess material from collars, cuffs, and lapels and shaping and pressing the same to form.

A principal object of the present invention is to incorporate in a commercial type collar shaping and pressing machine means for trimming excess material from the points of collars preliminarily to the operation of shaping and pressing the same, whereby to enhance the appearance of the finished product.

Another principal object of the present invention is to provide such a machine with improved means for turning the collars from the wrong side-out condition thereof, in which condition they are trimmed, to the right side-out condition thereof, in which latter condition they are shaped and pressed, whereby the material at the pointed extremities of the collars is free of bunching, in consequence of which the appearance of the finished article is improved.

Still another principal object of the present invention is to provide improved means of the character aforesaid which operates automatically conjointly with the trimming means to secure the collars against shifting movement during the trimming operation.

And still another principal object of the present invention is to provide such collar turning means wherein one collar turning point of a pair thereof automatically operates during each cycle of the machine first conjointly with the trimmer to hold the collar in place while it is being trimmed, and then with the other collar turning point during the collar turning operation.

A further object of the present invention is to provide such a machine with trimming means having coacting trimmer parts that are automatically biased into operative relation to one another for taking up wear and to thereby insure the best trimming action.

Further objects and advantages of the present invention will appear more fully hereinafter, it being understood that the present invention consists in the combination, construction, location and relative arrangement of parts, all as will appear more fully hereinafter, as shown in the accompanying drawings and as finally pointed out in the appended claims.

First referring particularly to Figures 1 through 6 of the drawings, a collar trimming and turning machine constructed in accordance with and embodying the principles of the present invention comprises a rigid table including an inclined table top 10 mounted upon four suitably braced legs 11. The table top 10 is fitted with a plurality of suitably located thermostatically controlled heating units designated generally by the letter A.

Suitably mounted upon the table top 10 in parallel superposed spaced relation thereto is a base plate 13. Overlying the latter is a triangular plate member 14 and a pair of elongated plate members 15—15 that are relatively disposed to conjointly form a pair of recesses which are adapted to receive work projected thereinto by planar shifting movement from the front of the machine.

Overlying the recesses aforesaid and conjointly with the base plate 13 forming a presser head are a pair of presser members or shoes 16—16 that are adapted for exerting a shaping pressure upon work underling the same. Suitable means are provided for actuating the shoes aforesaid.

Journalled in a pair of bearing blocks 17—17 that are mounted upon the base plate 13 is a transversely extending rock shaft 18, which has fixed thereon a yoke shaped member 19. The latter mounts a rod 20 from which depend a pair of brackets 21—21 and the shoes 16—16. When the yoke 19 is rocked counterclockwise, as viewed in Figures 4 and 5, the rod 20 is lowered, in consequence of which pressure is applied to the shoes 16—16. Inasmuch as the present invention is not primarily concerned with the design and construction of the heating units and the controls therefor or with the presser head, further detailed description in this connection is deemed unnecessary, however reference may be had to United States Patent No. 2,619,267, issued to Max T. Voigt, November 25, 1952, for further detailed description, if desired.

The machine is provided with a carriage, designated 22, that is fitted with a plurality of roller wheels 23, which are adapted for travel upon a suitable track structure 24 carried by the table top 10, the carriage being guided for rectilinear shifting movement lengthwise of the table by a part thereof that extends vertically freely through a slot 25 which is formed in the table top 10. Mounted upon the carriage 22 are a pair of die members or blades 26—26 that are supported by the carriage in parallel superposed spaced relation to the table top 10, which blades 26—26 are rectilinearly shiftable through the medium of the carriage 22, in their plane, from the front of the machine to the presser head and back again.

The machine is provided with a second carriage, designated 27, that is fitted with a plurality of roller wheels 28 which are adapted for travel upon the track structure 24, the carriage being guided for rectilinear shifting movement lengthwise of the table by parts thereof that extend respectively, vertically, freely through a pair of slots 29—29 which are formed in the table top 10. Mounted upon the carriage 27 are a pair of turning points 30—30 that are supported by the carriage in generally parallel superposed spaced relation to the table top 10, which turning points 30—30 are rectilinearly shiftable through the medium of the carriage 27, in their plane, from the front of the machine toward the presser head and back again.

Located on the table top 10 immediately in front of the presser head are a pair of laterally spaced collar trimming units, respectively designated generally by the letters R and L. One of these units will be described, and it will be understood that the other unit is identical, except that it is constructed to the opposite hand. The unit R comprises a frame that has a horizontal extending base wall 31, a pair of laterally spaced opposite side walls 32—32, a pair of horizontally extending laterally spaced arms 33—33 respectively extending from the opposite side walls 32—32 toward the front of the unit, and a horizontally extending shelf 34 extending between the opposite side walls 32—32 and the arms 33—33. Fitted between the latter for guidance thereby is a vertically reciprocable trimming head 35. The side of the latter opposed to the shelf 34 is rounded, as at 35a, recessed, as at 36, and suitably undercut, as at 37. The recess 36 and the undercut 37 conjointly form a pair of cutting edges 38—38 that diverge downwardly from the medium vertical plane of the head toward the opposite sides thereof.

Slidably seated upon the shelf 34 between a pair of guide elements 39—39 is a trimmer block 40. The nose of the latter is V-shaped and fitted into the recess 36 that is formed in the head 35, being constantly urged thereinto by a compression spring 41 which acts against a vertical extension of the shelf 34.

Fixed to the end of the base remote from the trimmer head 35 is a U-shaped bracket 42 that mounts a pin, designated 43, upon which there is pivoted an upper collar turning point 44. This collar turning point extends generally horizontally over the trimmer block 40, and is mounted, as by a pair of slots 44a—44a and a pair of screws 44b—44b, for adjustment fore and aft.

Secured to the underside and depending from the table top 10 is a U-shaped plate bracket 45, and secured to the lower end portion of the plate bracket 45 and depending therefrom is a second bracket 46. Suitably secured to the latter bracket is an asembly including a solenoid valve 47, air control valve 48, and a double acting pneumatic motor 49. The latter extends normal to the table top 10. The upper end portion of the piston, designated 50, is pivotally connected, as at 50a, to a link frame 51 that is mounted to rock about a pivot element 52 which is carried by a bracket 53. The free end portion of the link frame 51 is pivoted, as at 54, to the lower terminals of a pair of rods 55—55 that are associated respectively with the trimmer units and which extend upwardly normal to the table top 10 and slidably through the frames of the trimmer units to fixedly mount the trimmer heads 35—35.

Overlying a triangularly shaped plate 56 that extends laterally from the piston 50 are elements 57—57 that extend laterally respectively from the lower end portions of a pair of rods, designated 58—58. These rods are normal to the table top 10 and the upper end portions thereof slidably project respectively through the frames of the trimmer units each to be pivotally connected, as at 59, to rock arm 60 of the associated upper turning point 44. Each rod 58 mounts a pot 61 for movement therewith, which pot 61 houses a compression spring 62 that bears against a fixedly mounted plate 63 to bias the rod downwardly. A pair of screws 64—64 are threaded through the plate 56 in registry respectively with the undersurfaces of the elements 57—57.

Figure 17:
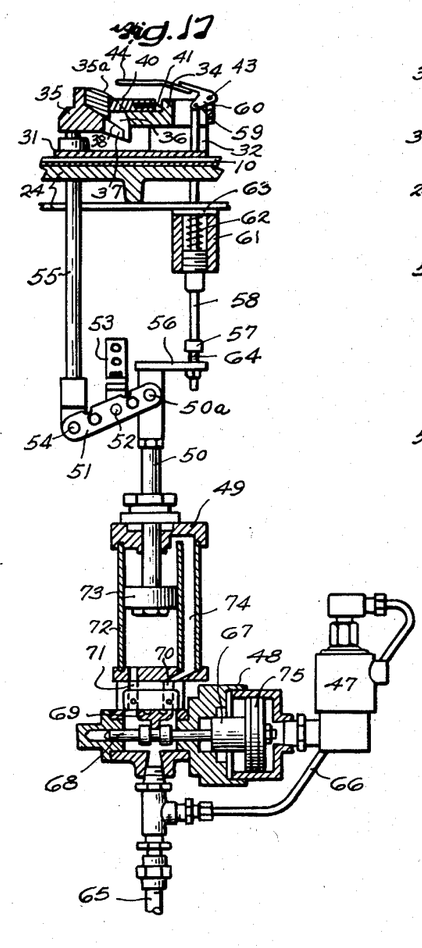
Figure 17 is a vertical section through the trimmer mechanism, showing the trimming head lowered and the turning point raised, as when the trimming operation is about to begin and after it has terminated.

Now referring to Figure 17, a main conduit 65 leading from a suitable source of air under pressure is connected to the air control valve 48, and a branch 66 therefrom is connected to the solenoid valve 47. Normally, the solenoid valve is deenergized, in consequence of which the passage of air therethrough is blocked. However, the conduit 65 is always in communication with the interior of the air control valve 48, in consequence of which pressure is exerted upon a small diameter head 67 that is mounted upon an axially shiftable rod 68, which latter is thereby positioned for maintaining a valve element 69 over a passage 70 for closing the same and away from a second passage 71 for opening the same. The conduit 65, therefore, is in communication with the lower end of the pneumatic motor cylinder, designated 72, and pressure is exerted against the piston head, designated 73, which latter is raised thereby, air on the upper side of the piston head being vented through a passage 74.

Obviously, when the piston 50 is in raised position, the link frame 51 is inclined so that the rods 55—55 and the trimmer heads 35—35 mounted thereon are held in the lowermost positions thereof. In this normal condition of the machine, the screws 64—64 respectively abut the undersurfaces of the elements 57—57 and thereby maintain the rods 58—58 and the upper turning points 44—44 in the elevated positions thereof, against the force of the pot spring 62.

Figure 18:
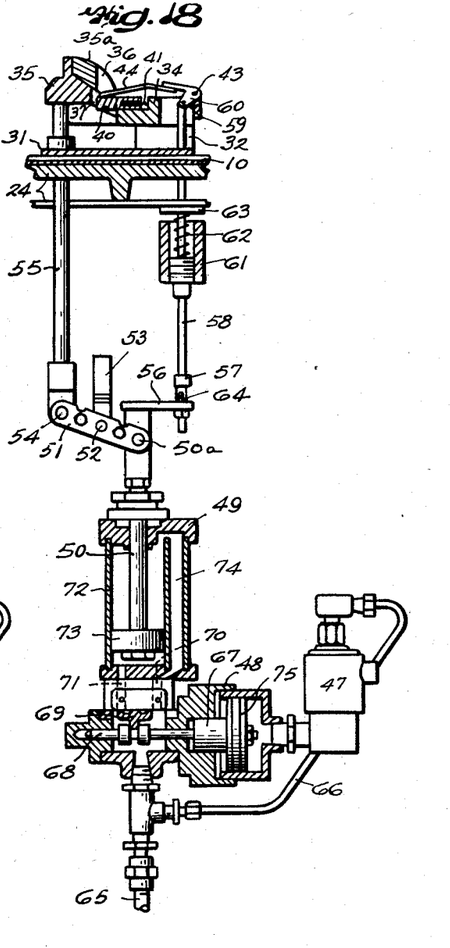
Figure 18 is similar to Figure 17, but shows the trimmer head raised and the turning point lowered, as when the operation is in progress.

Now referring to Figure 18, when the solenoid valve is energized, air from the branch conduit 66 flows therethrough and pressure is exerted against a large diameter head 75 mounted upon the rod 68. This pressure is greater than the pressure exerted against the small diameter head 67, in consequence of which the rod 68 shifts axially to thereby position the valve element 69 over the passage 71 for closing the same, and away from the passage 70 for opening the same. The conduit 65, therefore, through the passages 70 and 74 is in communication with the upper end of the cylinder 72, and pressure is exerted downwardly upon the piston head 73, which latter is lowered, air under the piston head being vented through the passage 71.

Obviously, when the piston 50 is in lowered position the link frame 51 is inclined so that the rods 55—55 and the trimmer heads 35—35 mounted thereon are held on the elevated positions thereof. In this condition of the machine the screws 64—64 are disengaged from the elements 57—57, and the rods 58—58 and the upper turning points 44—44 are maintained in the lowermost positions thereof under the influence of the pot springs 62—62.

Secured to and depending from the underside of the table top 10 are a pair of brackets 76—76 that mount an assembly including a solenoid valve 77, an air control valve 78 and a double acting pneumatic motor 79. The latter extends parallel to and lengthwise of the table top 10, in lower spaced relation thereto. The motor piston, designated 80, is fixed to the underside of the lower turning point carriage, as at 81. This latter assembly operates basically in the same manner as the solenoid valve, air control valve and pneumatic motor assembly described hereinbefore, in consequence of which any further detailed description is deemed unnecessary. However, it should be noted that in this case a hydraulic unit 82 is provided for suitably controlling retractive movement of the piston 80. A suitable unit for the purpose intended is manufactured by the Bellows Co. of Akron, Ohio (Model HCR–12A–20, reverse action, Bulletin HC–601). The motor piston 80 is connected to the check unit piston 83 by a bar 84, and the cylinders of the motor and check unit are interconnected by a bar 85. While the piston 80 is extended rapidly, the unit 82 operates to cut down the rate at which it is retracted.

For operating the presser head, the yoke 19 is pivotally connected, as at 86, to the upper end portion of a member 87 that extends downwardly therefrom through the table top 10 and loops about the pneumatic motor 79 and check unit 82 for pivotal connection at 88 to the piston, designated 89, of a single action pneumatic motor 90. Wrapped about the piston 89 is a compression spring 91, which latter acts against a sleeve 91a that is adjustably fixed upon the piston 89 to urge the latter into extended position for closing the presser head. The pneumatic motor 90 and a solenoid valve 92 for controlling the same are mounted upon a cross beam 93 that extends between the two rear legs 11 that support the table top 10. The solenoid valve is connected to the source of air under pressure through a conduit 94, and with the upper end of the motor cylinder, designated 95, by a conduit 96. Normally the solenoid valve 92 is deenergized and closed to the passage of air, in consequence of which the piston 89 is extended under the influence of the spring 91 and operates to close the presser head. When the solenoid valve 92 is energized, it is open to the passage of air, whereupon air from the conduit 96 enters the upper end of the motor cylinder 95 and forces the piston 89 downwardly against the influence of the spring 91 to open the presser head.

Referring particularly to Figures 12 through 16, each lower turning point 30 is pivotally secured, as by a pin 97 to a suitable block 98, which latter is fixedly secured to the top of the underlying carriage frame, as by a stud 99 and a pin 100. Depending from the turning point 30 is a pressure rod 101, which pressure rod is fitted with a coil spring 102 that operates to bias the turning point 30 upwardly, and with a collar 103 that operates to limit the pivotal movement of the turning point 30 so that the latter may swing through an angle of about three degrees. When the lower turning points 30—30 are elevated, they are above, and when they are depressed, they are in the same plane, as the upper turning points 44—44.

For depressing the lower turning points, the lower end portions of the pressure rods 101—101 are provided with hooks 104—104 that are adapted for engagement with suitably formed cams 105—105 which are stationarily secured to the table top 10, as by brackets 106. After the lower turning point carriage 27 has advanced toward the presser head a predetermined distance the hooks or cam followers 104—104 respectively engage the cams 105—105. Thereafter, as the carriage continues its traverse the cam followers and cams conjointly operate to swing the pressure rods 101—101 and turning points 30—30 downwardly against the influence of the coil springs 102—102.

Depending from the table top 10 is a micro switch 107, which switch is provided with an arm 108. For actuating the latter, a suitably formed cam 109 is fixed to the carriage 27. After initial movement of the carriage 27, from the position thereof shown in Figure 7, the cam 109 engages the switch arm 108. Thereafter, upon continuance of the carriage traverse, the cam 109 operates to actuate the switch arm 108, as shown in Figure 8, and to thereby close the switch. As soon as the cam 109 has passed under the switch arm 108, the latter returns to its initial position and the switch reopens, as shown in Figure 9. When the carriage 27 returns to its initial position, the cam 109 again passes under the switch arm 108, but this time it merely operates to pivot the lower end portion of the arm 108 about a pivot 110, in consequence of which the switch 107 remains open.

Figure 11:
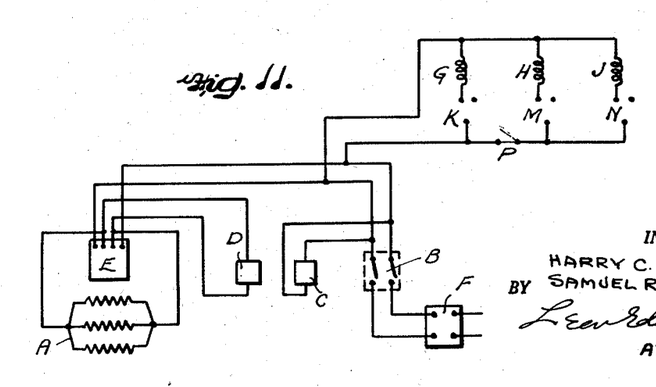
Figure 11 is a wiring diagram.
Figures 13, 14, 15, 16:
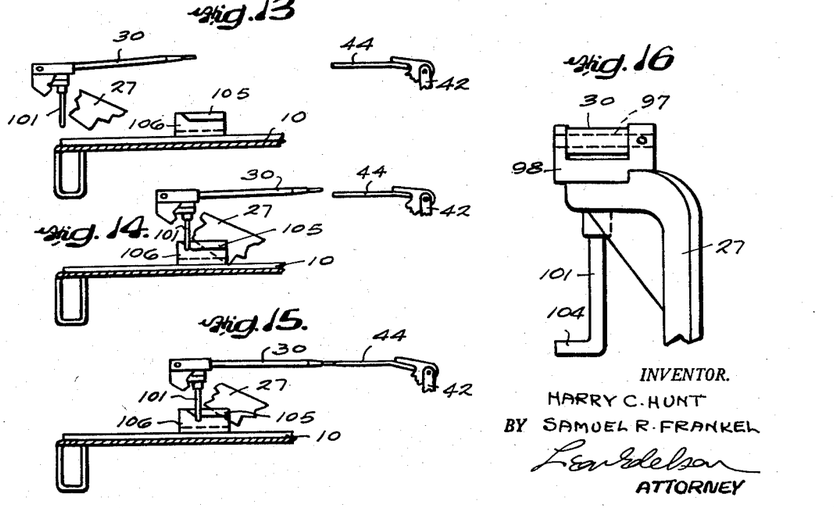
Figures 13, 14 and 15 are vertical views showing the collar turning points in various stages of their traverse.
Figure 16 is an end view of the turning point shown in Figure 12.

Referring particularly to Figure 11, the electric circuit includes heating coils A, a two-pole single throw switch B, a pilot light C, a thermostat pilot light D, a thermostat E, an interval timer F, pressure arm, trimmer and lower turning points solenoid valve coils G, H and J, pressure arm foot petal switch K, trimmer micro switch M, lower turning point foot pedal switch N, and safety switch P.

Interval timer F operates to automatically make electric power available during normal working hours. When the machine is to be operated, the switch B is closed, whereupon pilot lights C and D are illuminated, indicating that the machine is being supplied with power. The thermostat switch E is closed, and when the coils F are properly heated, the thermostat switch E automatically opens and the pilot light D goes out. Assuming that air under suitable pressure is available in the pneumatic circuit, designated generally by the letter T, the machine is now ready for operation.

As is well known in the art, multiple-ply collars, cuffs and like units are conventionally manufactured by initially sewing the several plys thereof together along all but their inner edges, following which the plied unit is turned right side out and pressed to shape to condition it for securement to the garment of which it is intended to form a part. In its initial condition, that is, prior to turning it right side out, the plied unit normally consists of a pair of facing plies and an interliner arranged in superposed relation, the interliner being disposed externally of the facing plies and the latter being arranged with their normally exposed surfaces in flatwise engagement with one another. The three plies so relatively arranged as a unit are sewed together by a marginal line of stitching which extends along one longitudinal edge and the opposite transverse edges of the unit, the opposite points of the collar or the like being respectively formed between the longitudinal line of stitching and each transverse line thereof. The unit so initially formed is then turned right side out so as to dispose the interliner between the facing plies and to present to external view those surfaces of the latter which form the outer faces of the collar, cuff or the like.

In operation of the machine, the left hand corner of a collar (turned wrong side out) is fitted upon the right hand upper turning point 44, which point is received between the two facings of the collar. The operator now depresses the foot pedal switch N, whereupon the same closes and the lower turning point solenoid valve coil J is energized to operate the pneumatic motor 79 and retract the piston 80. As the latter retracts, the lower turning point carriage 27 advances.

Figures 1, 2:
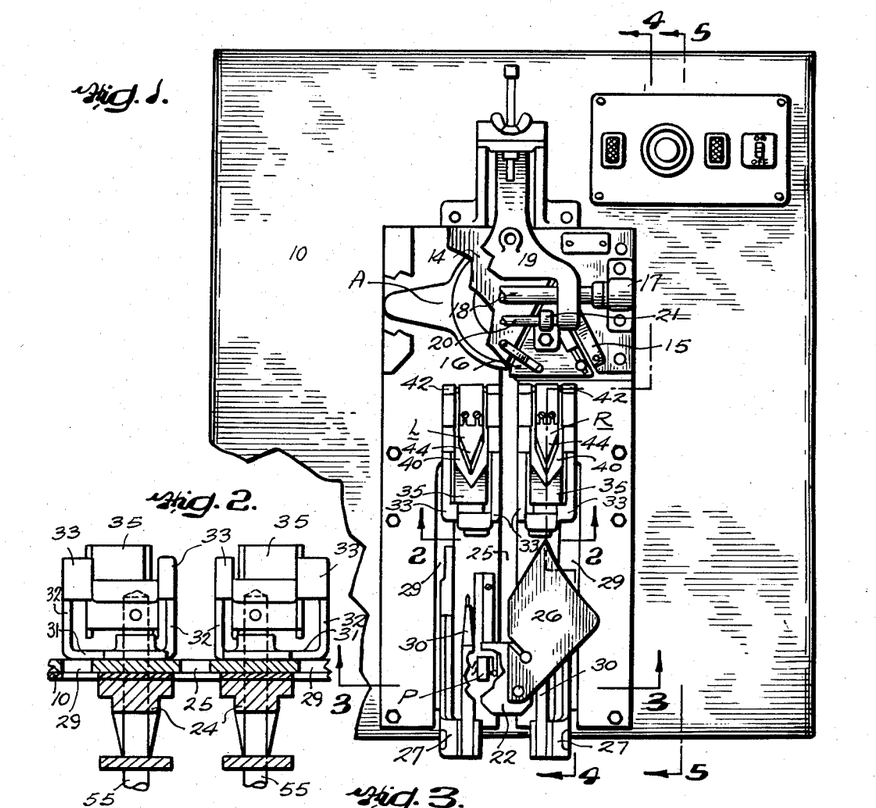
Figure 1 is a plan view of a machine constructed in accordance with and embodying the principles of the present invention.
Figures 2, 3, 4 and 5 are vertical sections on lines 2—2, 3—3, 4—4 and 5—5, respectively, of Figure 1.
Figure 3:
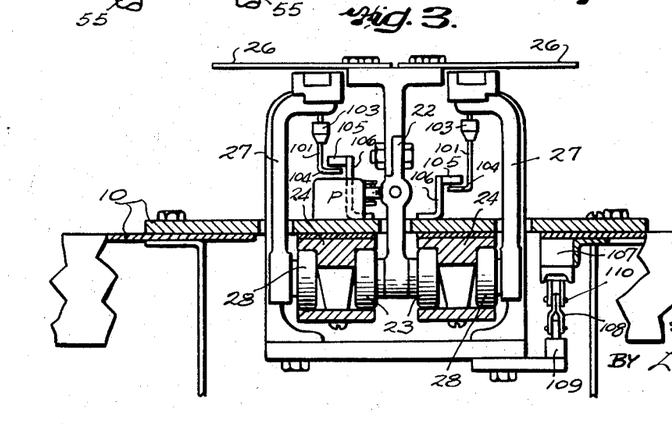
Figure 4:
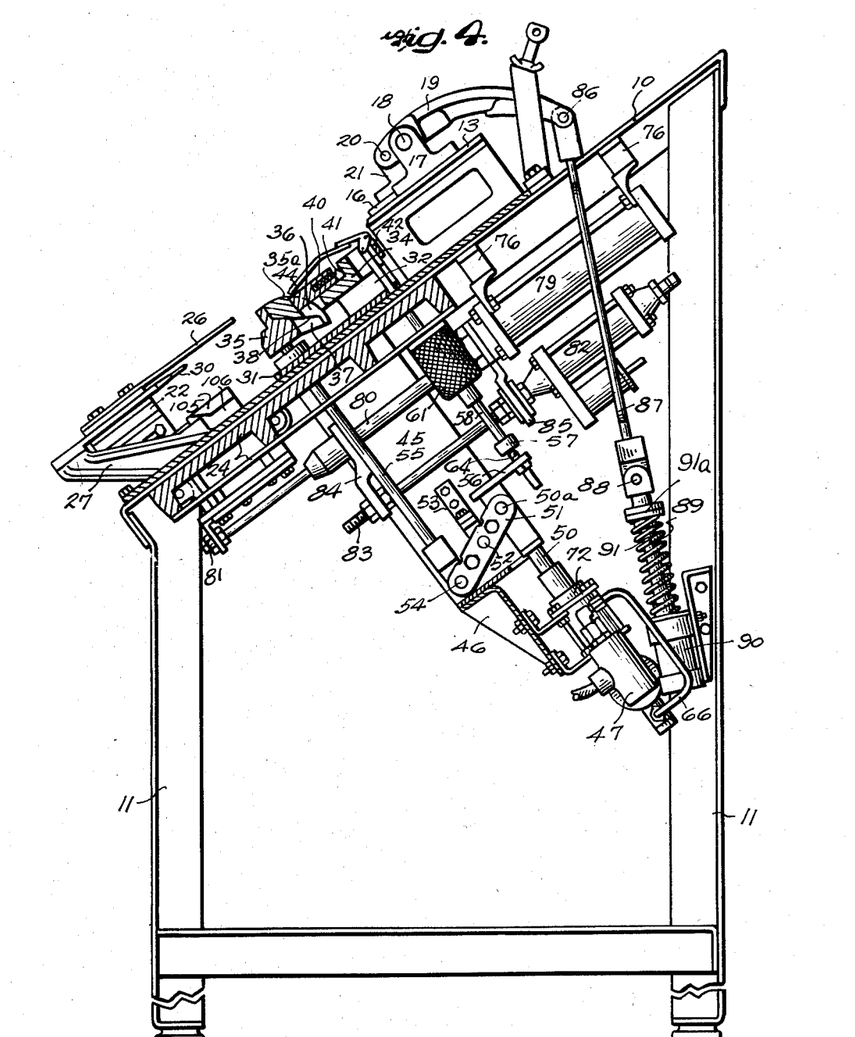
Figures 5, 5A:
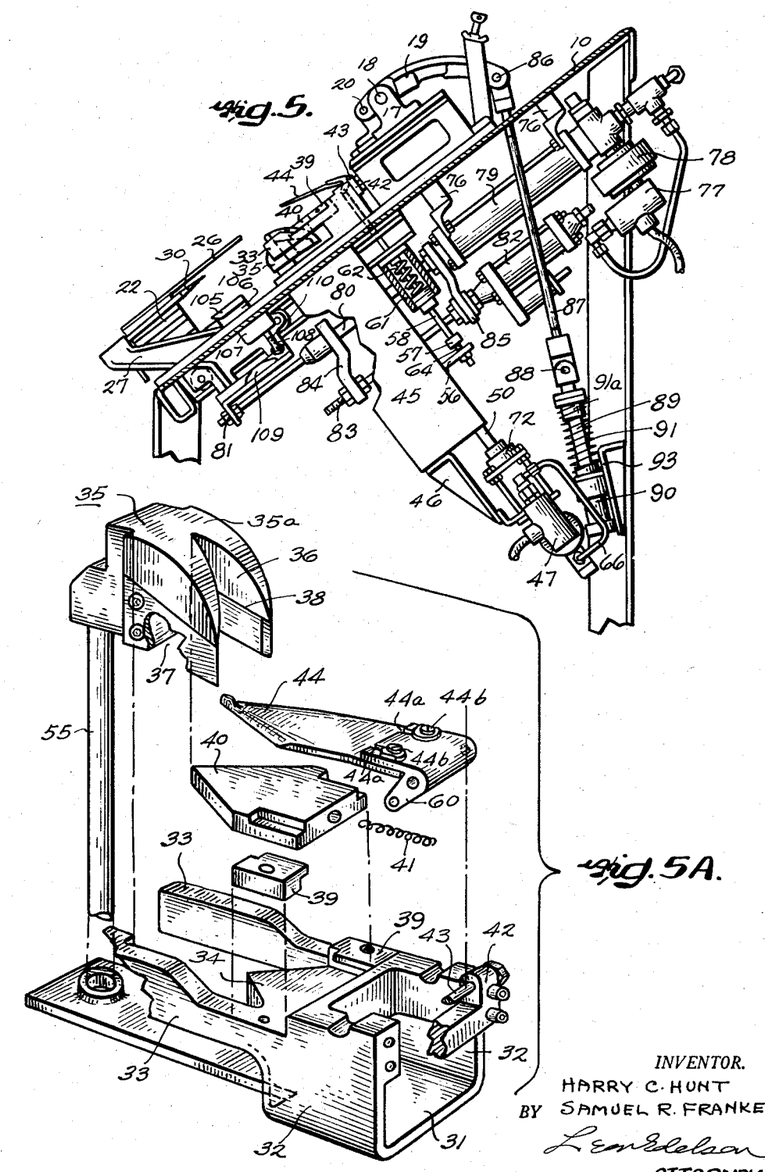
Figure 5a is an exploded perspective view of the trimmer mechanism.
Figure 6:
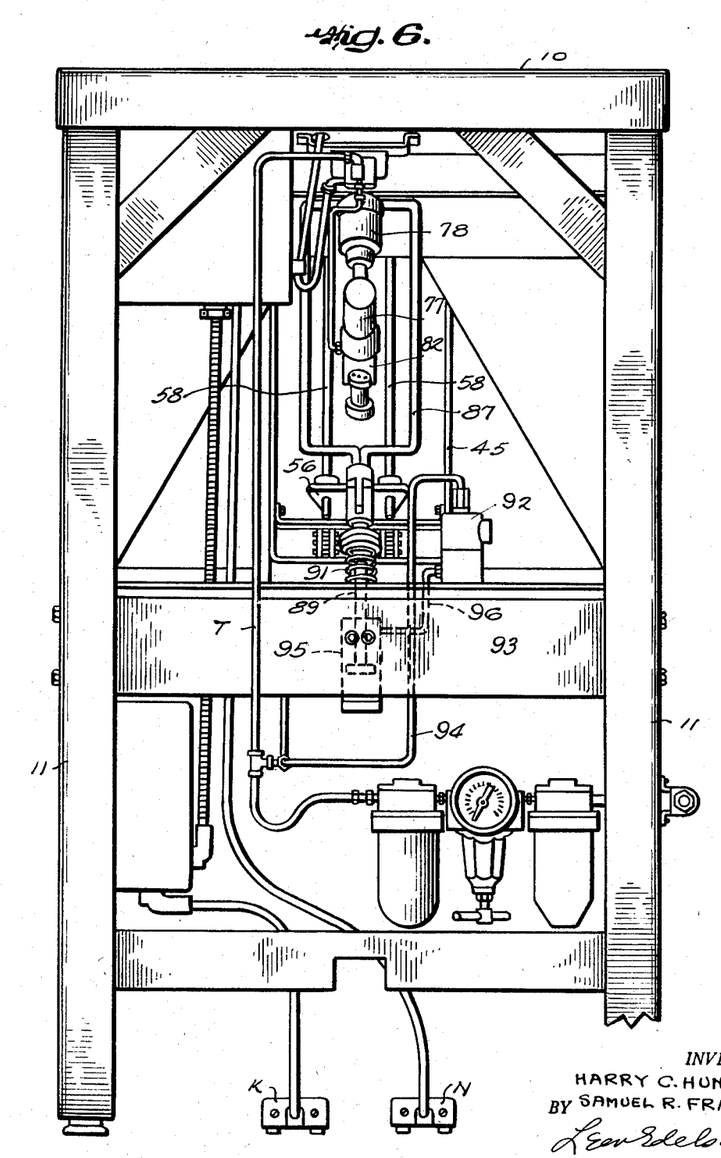
Figure 6 is a rear view of the machine.
Figure 7:
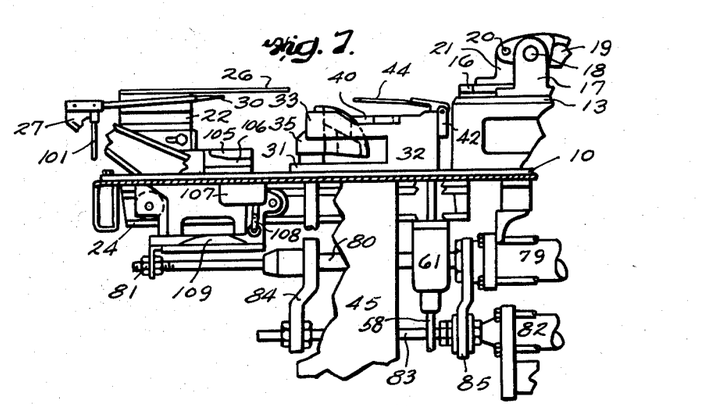
Figure 7 is a vertical section showing machine at beginning of a cycle.
Figure 8:
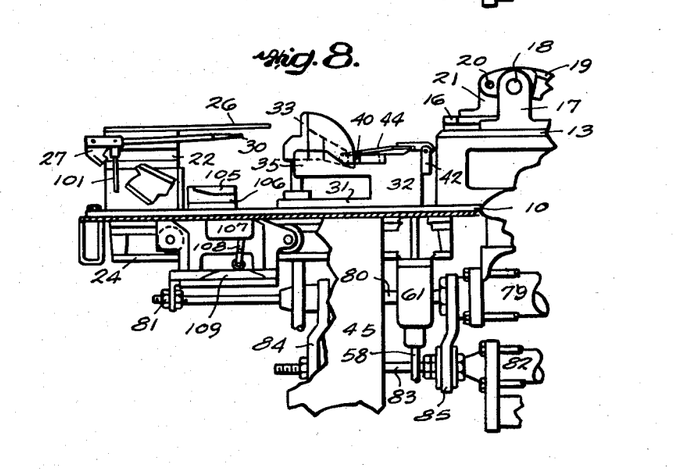
Figure 8 is similar to Figure 7, but shows the condition of the machine shortly after the cycle begins, just before actual trimming.
Figures 9, 10, 12:
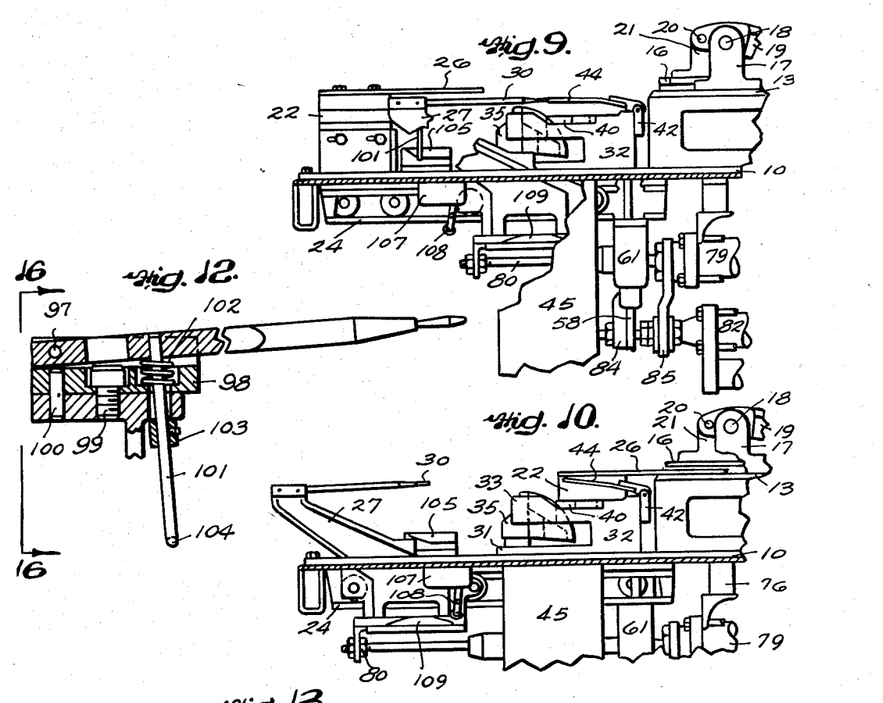
Figure 9 is similar to Figures 7 and 8, but shows the condition of the machine just after the trimming operation has been completed and the collar turned right-side out.
Figure 10 is similar to Figures 7, 8 and 9, but shows the condition of the machine when the die blades are advanced into the presser head.
Figure 12 is a longitudinal section through a collar turning point.

Initial movement of the carriage 27 advances the cam 109 into engagement with the micro switch arm 108 (compare Figures 7 and 8). Upon further movement of the carriage 27 the cam 109 operates the switch arm 108 and thereby closes the switch 107, whereupon the trimmer solenoid valve coil H is energized to operate the pneumatic motor 49 and retract the piston 50. The link frame 51 thereupon rocks about the pivot element 52 and raises the rods 55—55 and the trimmer heads 35—35 that are mounted thereon. Simultaneously, the rods 58—58 follow the piston 50 downwardly under the influence of the springs 62—62 until the upper turning points 44—44 bear respectively upon the underlying trimmer blocks 40—40. Thus, the point of the collar mounted upon the right hand upper turning point 44 is held firmly down against the trimmer block 40 and secured against shifting, in position to be trimmed, the shearing edges 38—38 of the right hand trimmer head 35 having been raised sufficiently to overlie the material that is to be trimmed off.

When the lower turning point carriage 27 has advanced a predetermined distance, the cam 109 passes by the switch arm 108, which latter is thereby released to reopen the switch 107 (compare Figures 8 and 9), whereupon the solenoid valve coil is deenergized to operate the pneumatic motor 49 and thereby again extend the piston 50. The link frame 51 thereupon rocks in the opposite direction about the pivot element 52 and lowers the rods 55—55 and the trimmer heads 35—35, whereupon the cutting edges 38—38 of the right hand trimmer head 35 and the opposed edges of the associated trimmer block 40 conjointly operate to trim the excess collar material that overhangs the trimmer block 40. After some lost motion between the adjusting screws 64—64 and the elements 57—57, the rods 58—58 follow the piston 50 upwardly against the influence of the springs 62—62 and swing the upper turning points 44—44 and the collar mounted upon the right hand turning point 44 upwardly. In the meantime, before the excursion of the lower turning point carriage 27 has been completed, the trimming heads 35—35 are lowered to their initial positions, below the working plane of the lower turning points 30—30. It should be noted that the springs 41—41 operate to shift the trimmer blocks 40—40 so as to take up wear. As the lower turning points 30—30 approach the limit of their travel, the hooks 104—104 that depend respectively therefrom engage the cams 105—105 and operate to swing the lower turning points 30—30 downwardly against the influence of the springs 102—102 into point to point registry respectively with the upper turning points 44—44. The material at the pointed extremity of the collar is thereby turned under the right hand lower turning point 30, instead of being crushed between the turning points.

With the lower turning point foot pedal still depressed, the operator turns the trimmed collar from its wrong-side-out condition on the right hand upper turning point 44 to its right-side-out condition over the right hand lower turning point 30, the uncrushed material aforesaid being thereby folded flat across the pointed extremity of the collar. Now the lower turning point foot pedal is released, whereupon the switch N is opened and the lower turning point solenoid valve coil J is deenergized to operate the pneumatic motor 79 and extend the piston 80. The lower turning point carriage 27 is thereby returned rapidly to its initial position, without the cam 109 operating the micro-switch 107. As the initial position aforesaid is approached, the collar is fitted and smoothed over the right hand die blade 26.

Now the die blade carriage 22, with the collar fitted over the right hand die blade 26 is advanced manually and the collar is positioned for the pressing operation. Preliminarily to advancing the die blade carriage, however, the pressure arm foot pedal K is depressed, whereupon the pressure arm solenoid valve coil G is energized to operate the pneumatic motor 90 and retract the piston 89 against the influence of the coil spring 91. The rod 87 is thereby lowered, whereupon the yoke 19 is rocked about the shaft 18 to open the presser head for accommodating the die blades 26—26 and the collar mounted upon the right hand die blade 26. Then foot pedal K is released, whereupon the solenoid valve coil G is deenergized, in consequence of which pressure is cut off from the pneumatic motor 90 and the coil spring 91 expands to close the presser head. Before the presser head can close fully, the die blades 26—26 are manually withdrawn, leaving the collar in the presser head. Pressure and heat are applied to the collar as long as the operator refrains from depressing the foot pedal K. After a time, the latter is depressed and the pneumatic motor 90 again operates to open the presser head, whereupon the pressed collar is removed from the machine. Thereafter the foot pedal K is again released and the presser head automatically recloses. As a precaution against the die blades 26—26 being advanced prematurely, the machine is suitably fitted with a safety switch P that is operated by the die blade carriage 22.

While a collar remains subject to heat and pressure on the right hand side of the machine, the left hand side of the machine is loaded with a second collar that is trimmed and transferred to the left hand die blade. After the first collar is withdrawn from the presser head, the second collar is advanced thereinto, while the second collar remains subject to heat and pressure, the right hand side of the machine is reloaded, etc.

If it is found that the lower turning points do not move into the desired point to point contact with the upper turning points, this condition may be corrected by loosening the screws 44b—44b, shifting the upper turning points to the desired positions thereof relative to the lower turning points, and then retightening the screws. When changing over from work on collars of a specific shape to collars of a different shape, it may be necessary to remove the trimmer heads 35—35, trimmer blocks 40—40 and upper turning points 44—44 and replace these members with others especially designed to accommodate the new work. Normally, however, instead of changing the upper turning points 44—44, it is merely necessary to shift them longitudinally in the manner just described. In addition, it may be necessary to adjust the machine so that a different pressure is applied to the collars to be pressed. The latter adjustment may be effected by merely changing the position of the sleeve 91a upon the piston 89.

Although, as illustrated and described, the lower turning point carriage 27 is actuated through the medium of the double acting pneumatic motor 79, and the presser head is opened through the medium of the single acting pneumatic motor 90, it will be understood that these pneumatic motors 79 and 90 could be eliminated in favor of manual actuation of the carriage 27 and presser head. In this connection, reference may be had to United States Patent No. 2,619,267, issued to M. T. Voigt, November 25, 1952.

It will be understood that the present invention is susceptible of various changes and modifications which may be made from time to time without departing from the general principles or real spirit of the invention, accordingly it is intended to claim the same broadly, as well as specifically, as indicated by the appended claims.

What is claimed as new and useful is:

1. In apparatus for trimmingg, shaping and pressing collars and like articles, a presser head including a fixed base member, and a relatively movable member overlying said base member, a die member adapted for receiving and shaping a collar to be pressed, means mounting said die member in a plane extending between said fixed and movable presser head members and for rectilinear shifting movement in said plane back and forth between a position remote from said presser head and a position within said presser head, a collar trimming mechanism operatively interposed between said presser head and die member including a pair of coacting trimmer parts relatively movable along a path substantially normal to said plane, and a pair of coacting collar turning members having pointed ends for point to point contact in the region of said trimming mechanism, one of said collar turning members being swingable into overlying engagement with one of said trimmer parts to clampingly engage and hold the work in fixed position during the trimming operation.

2. In apparatus for trimming, shaping and pressing collars and like articles as defined in claim 1 wherein one of the trimmer members is operatively fixed in position on one side of and in spaced relation to the plane of the die member, the coacting trimmer member is mounted for reciprocal movement relative thereto and for being positioned therewith on said one side of and in spaced relation to the plane of the die member, and said die member is freely shiftable between the extreme positions thereof, across the path of said movable trimmer member, when said trimmer members are positioned together in the manner aforesaid.

3. In apparatus for trimming, shaping and pressing collars and like articles as defined in claim 1 wherein one of the trimmer members is operatively fixed in position on one side of and in spaced relation to the plane of the die member, the other trimmer member is reciprocable relative thereto and positionable therewith on said one side of and in spaced relation to the plane of the die member, said die member is freely shiftable between the extreme positions thereof, across the path of said reciprocable trimmer member, when said trimmer members are positioned together in the manner aforesaid, and said trimmer members are provided respectively with angularly related coacting shearing edges operatively separable for receiving therebetween material to be trimmed from a collar.

4. In apparatus for trimming, shaping and pressing collars and like articles as defined in claim 3 wherein the operatively fixed trimmer member has a V-shaped nose extending normal to the path and into one side of the reciprocable trimmer member, and the latter is provided with a longitudinally extending recess slidably receiving said nose and with an undersurface disposed at an acute angle relative to said path whereby to form conjointly with the opposite side surfaces of said recess, at the meeting edges of said under and opposite side surfaces, material shearing edges that diverge from top to bottom, and outwardly in opposite directions from the center, of said reciprocable trimmer member.

5. In apparatus for trimming, shaping and pressing collars and like articles as defined in claim 3 wherein the trimmer members are slidably engaged with one another throughout the entire range of movement of the reciprocable trimmer member, and the operatively fixed trimmer member is spring biased into engagement with said reciprocable trimmer member whereby to automatically take up wear.

6. In combination, a first pointed collar turning member, a second rectilinearly shiftable pointed collar turning member disposed in spaced slightly elevated position relative to said first collar turning member, means yieldably sustaining said shiftable collar turning member in said elevated position during its rectilinear shifting movement back and forth between a position remote from said first collar turning member and a position proximate the same, and means for automatically lowering said shiftable collar turning member for point to point registry of the opposed pointed end portions of said collar turning members as the said shiftable collar turning member approaches said first collar turning member.

7. The combination defined in claim 6 wherein the shiftable collar turning member is pivotally mounted upon the means for shifting the same, and wherein said first collar turning member is vertically swingable about a fixed axis.

8. The combination defined in claim 6 wherein the means for shifting the shiftable collar turning member is a carriage member underlying and supporting the latter, the shiftable collar turning member is pivotally mounted upon said carriage member, and spring means operatively intervenes said shiftable turning member and its supporting carriage to yieldably elevate said shiftable collar turning member.

9. The combination defined in claim 6 wherein the means for shifting the shiftable collar turning member is a carriage member pivotally supporting the shiftable collar turning member, and wherein the means for automatically lowering said shiftable turning member includes a cam rod secured to said turning member and projecting through said carriage member and cam means engageable by said cam rod during the last portion of the traverse of said shiftable collar turning member toward said first collar turning member whereby to depress said shiftable collar turning member against the influence of said yielding elevating means.

10. In combination with a collar trimming mechanism including a stationary trimmer member, and a coacting reciprocable trimmer member, a first pointed collar turning member disposed in overlying relation to said stationary trimmer member and swingable into collar-clamping engagement therewith, a rectilinearly shiftable collar turning member having a pointed end adapted to be brought into point to point contact with said first collar turning member, means for mounting said shiftable collar turning member for rectilinear shifting movement back and forth between a position remote from said first collar turning member and a position proximate the same, and means for actuating said trimmer mechanism and collar turning members in predetermined timed relation whereby during the trimming operation said first collar turning member is depressed for coaction with the underlying stationary trimmer member for clamping the work in place, and whereby during the collar turning operation said first collar turning member is elevated for point to point registry with the shiftable collar turning member to facilitate the collar turning operation.

11. The combination defined in claim 10 wherein the collar turning members point toward one another across the trimming mechanism, and the first collar turning member is pivotally mounted by the end portion thereof remote from the shiftable collar turning member for swinging movement of said first collar turning member, whereby the free end portion of the latter may be elevated and depressed.

12. In apparatus of the character described, collar turning means including a stationary elongated collar turning member, a shiftable elongated collar turning member, disposed in spaced end to end relation to said stationary collar turning member, and means mounting said shiftable collar turning member for rectilinear shifting movement back and forth between a position remote from said stationary collar turning member and a position proximate the same, a collar trimming mechanism including a stationary trimmer member, and a coacting reciprocable trimmer member, and means for actuating said shiftable collar turning and reciprocable trimmer members in predetermined timed relation including a motor for actuating said reciprocable trimmer member.

13. The apparatus defined in claim 12 wherein the motor for actuating the reciprocable trimmer member is operated by fluid pressure supplied through a valve controlled by a solenoid connected in electric circuit with switch means, and said shiftable collar turning member and switch means operate in predetermined timed relation.

14. The apparatus defined in claim 12 wherein the motor for actuating the reciprocable trimmer member is operated by air under pressure supplied through a solenoid controlled valve, and the means for actuating said shiftable collar turning and reciprocable trimmer members in predetermined timed relation includes a stationary switch connected in electric circuit with said solenoid and operated automatically by means mounted for shifting rectilinearly back and forth with said shiftable collar turning member.

15. In apparatus of the character described, collar turning means including a stationary elongated collar turning member, a shiftable elongated collar turning member disposed in spaced end to end relation to said stationary collar turning member, and carriage means mounting said shiftable collar turning member for recilinear shifting movement back and forth between a position remote from said stationary collar turning member and a position proximate the same, a collar trimming mechanism including a stationary trimmer member, and a coacting reciprocable trimmer member disposed for operation in the region where said collar turning members are proximate one another, and means for actuating said shiftable collar turning and reciprocable trimmer members in predetermined timed relation including a pneumatc motor for actuating said reciprocable member, a solenoid controlled valve through which pressure is supplied to said motor, a stationary switch connected in electric circuit with said solenoid and operated automatically by said carriage means for initiating the trimming operation and completing the same before said shiftable collar turning member enters the region in which said reciprocable trimming member operates.

16. In combination with a collar trimming mechanism including a stationary trimmer member, and a coacting reciprocable trimmer member, a stationary elongated collar turning member disposed in overlying relation to said stationary trimmer member and mounted for being elevated and depressed relative thereto, a shiftable collar turning member disposed in spaced end to end relation to said stationary collar turning member, means for mounting said shiftable collar turning member for rectilinear shifting movement back and forth between a position remote from said stationary collar turning member and a position proximate the same, and means for actuating said trimmer mechanism and collar turning members including yieldable means tending to depress said stationary trimmer member, and a motor for actuating said reciprocable trimmer member and for elevating said stationary collar turning member against the influence of said yieldable means in predetermined timed relation whereby during the trimming operation said stationary collar turning member is depressed for coaction with the underlying stationary trimmer member for clamping the work in place, and whereby during the collar turning operation said stationary collar turning member is elevated and aligned with the shiftable collar turning member to facilitate the latter operation.

17. In combination with a collar trimming mechanism including a stationary trimmer member, and a coacting reciprocable trimmer member, a stationary elongated collar turning member disposed in overlying relation to said stationary trimmer member and mounted for being elevated and depressed relative thereto, a shiftable collar turning member disposed in spaced end to end relation to said stationary collar turning member, means for mounting said shiftable collar turning member for rectilinear shifting movement back and forth between a position remote from said stationary collar turning member and a position proximate the same, and means for actuating said trimmer mechanism and collar turning members in predetermined timed relation including spring means tending to depress said stationary trimmer member, and a motor for actuating said reciprocable trimmer member and for elevating said stationary collar turning member against the influence of said spring means after lost motion between said motor and stationary collar turning member at least during the initial portion of the working stroke of said reciprocable trimmer member, whereby during the trimming operation said stationary collar turning member is depressed for coaction with the underlying stationary trimmer member for clamping the work in place, and whereby during the collar turning operation said stationary collar turning member is elevated and aligned with the shiftable collar turning member to facilitate the latter operation.

18. In combination with a collar trimming mechanism including a stationary trimmer member, and a coacting reciprocable trimmer member, a stationary elongated collar turning member disposed in overlying relation to said stationary trimmer member and mounted for being elevated and depressed relative thereto, a shiftable collar turning member disposed in spaced end to end relation to said stationary collar turning member, means for mounting said shiftable collar turning member for rectilinear shifting movement back and forth between a position remote from said stationary collar turning member and a position proximate the same, and means for actuating said trimmer mechanism and collar turning members in predetermined timed relation including a motor for shifting said shiftable collar turning member and the mounting means therefor back and forth as a unit, and a second motor for reciprocating said reciprocable trimmer member and controlling said stationary collar turning member.

19. The combination defined in claim 18 wherein said motors are operated by fluid pressure supplied thereto respectively through a pair of solenoid controlled valves, the solenoids are connected in electric circuit with a pair of switches, one of which is operated automatically in predetermined timed relation to operation of the other manually.

20. The combnation defined in claim 18 wherein the motor for actuating the shiftable collar turning member is operatively fitted with auxiliary means for checking and controlling the rate of movement of said shiftable collar turning member toward said stationary collar turning member.

21. In combination, a presser head including a fixed base member, and a relatively movable member overlying said base member, a die member adapted for receiving and shaping a collar to be pressed, means mounting said die member in a plane extending between said fixed and movable presser head members and for rectilinear shifting movement in said plane back and forth between a position remote from said presser head and a position within said presser head, and means for opening and closing said presser head including a fluid pressure motor operatively connected to said movable presser head member, spring means operatively interposed between said movable presser head member and fluid pressure motor to yieldably maintain said presser head closed, said motor being operable for opening said presser head against the influence of said yieldable spring means.

22. In apparatus for trimming, shaping and pressing collars and like articles, a presser head adapted for receiving a die member, a die member shiftable for projection into and withdrawal from said presser head, a collar trimming mechanism operatively interposed between said presser head and die member, collar turning means, and means for operating said collar trimming mechanism and collar turning means in predetermined timed relation and said presser head independently including a set of fluid pressure motors associated respectively with said presser head, collar trimming mechanism and collar turning means, a set of solenoid controlled valves for controlling the supply of pressure to said motors, and switch means connected in electric circuit with said solenoids, whereby a first and a second one of said switch means are operable manually independently of one another for respectively controlling said presser head and collar turning means, and a third one of said switch means is automatically operated in response to movement of said collar turning means to control said collar trimming mechanism.

23. In apparatus for trimming, shaping and pressing collars and like articles, a presser head adapted for receiving die members, a pair of laterally spaced die members, a carriage mounting said die members for shifting the same into and withdrawing them from said presser head, a pair of laterally spaced collar trimming mechanisms operatively interposed between said presser head and die members including a pair of stationary collar turning members, a pair of shiftable collar turning members respectively underlying said die members, a carriage mounting said shiftable collar turning members for shifting the same toward said collar trimming mechanism into end to end engagement respectively with said stationary collar turning members, means for operating said collar trimming mechanisms and collar turning members in predetermined timed relation and said presser head independently including a set of fluid pressure motors associated respectively with said presser head, collar trimming mechanisms and the carriage mounting the shiftable collar turning members, a set of solenoid controlled valves for controlling the supply of pressure to said motors, and switch means connected in electric circuit with said solenoids, whereby a first and a second one of said switch means are operable manually independently of one another for respectively controlling said presser head and collar turning members, and a third one of said switch means is automatically operated in response to shifting of said shiftable collar turning member to control said collar trimming mechanisms, and a safety switch connected in said circuit and operable by said carriage for the die members for opening the circuit to said collar trimming mechanisms to terminate operation thereof when said carriage for the die members is shifted prematurely toward said presser head.

References Cited in the file of this patent

UNITED STATES PATENTS

| | | |
|---|---|---|
| 2,553,194 | Hovell | May 15, 1951 |
| 2,591,320 | Trahan | Apr. 1, 1952 |
| 2,741,407 | Goldberg | Apr. 10, 1956 |
| 2,804,244 | Hunt | Aug. 27, 1957 |